United States Patent Office 3,329,161
Patented July 4, 1967

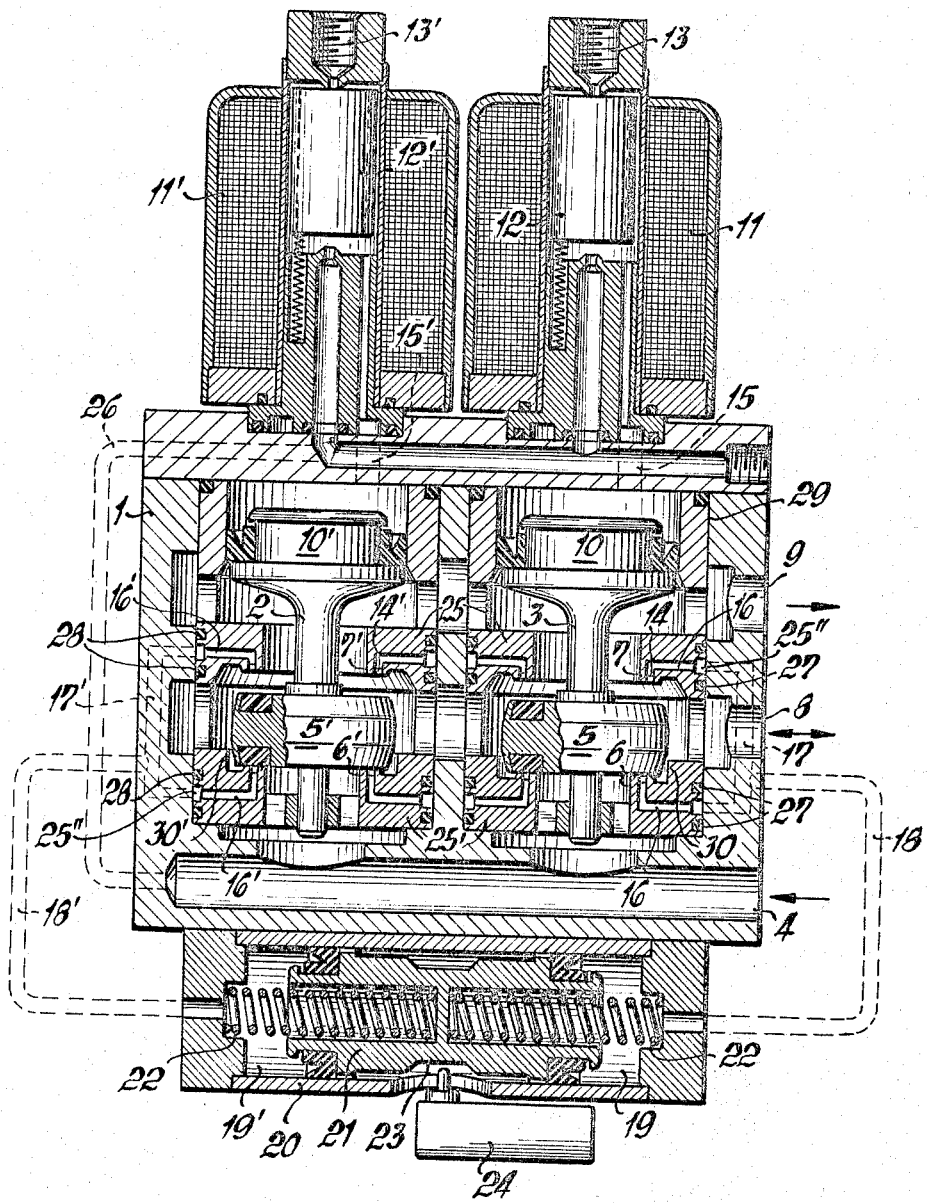

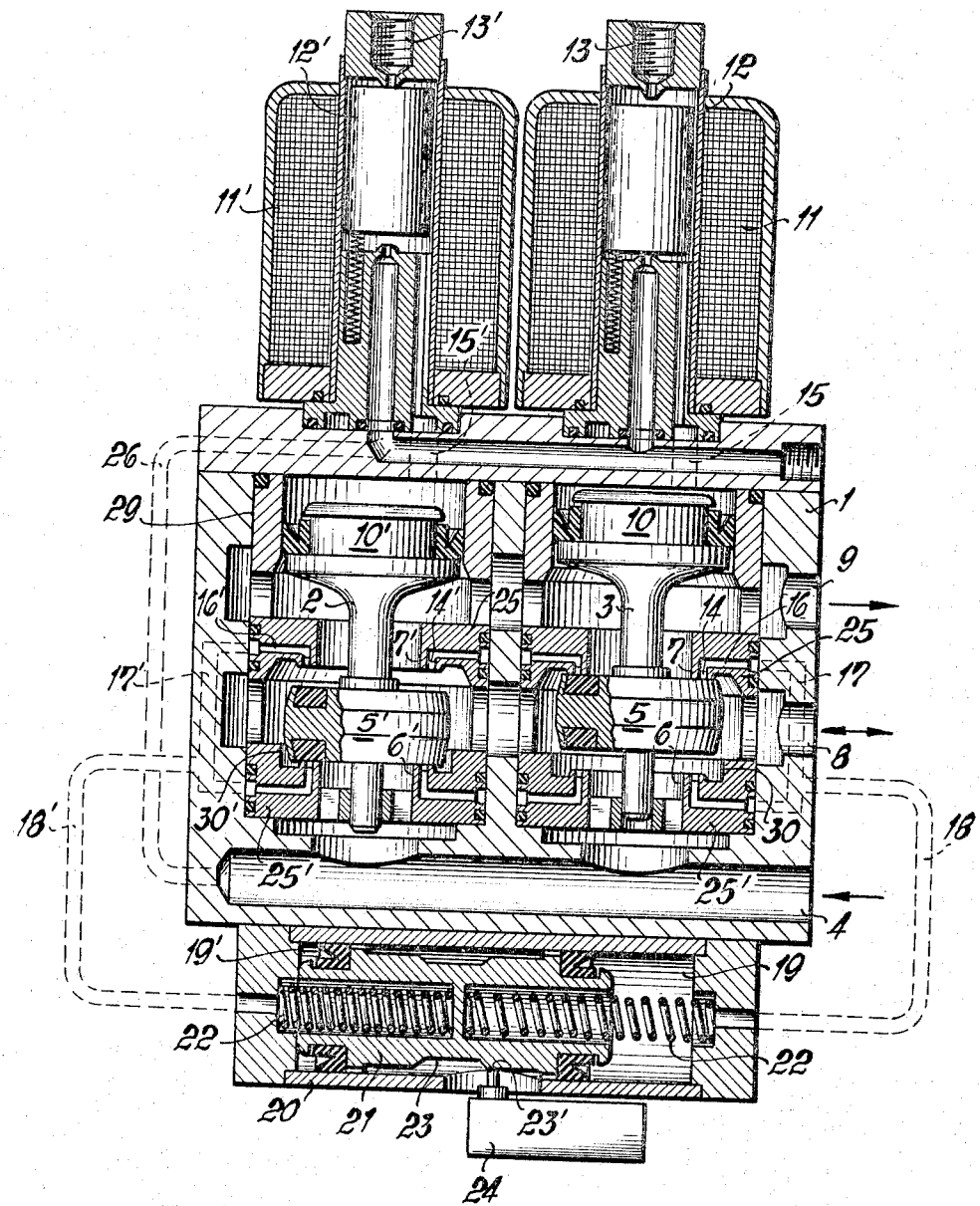

3,329,161
MASTER VALVES FOR CONTROLLING AN ACTUATOR PARTICULARLY FOR OPERATING THE CLUTCH OR BRAKE OF A PRESS
Erich Ruchser, Rommelshausen, Germany, assignor to Erich Herion, Stuttgart-Frauenkopf, Germany
Filed Feb. 10, 1965, Ser. No. 431,653
Claims priority, application Germany, Feb. 13, 1964, H 51,663
4 Claims. (Cl. 137—596.16)

This invention relates to a valve unit for controlling pressure-fluid operated device, particularly the clutch or brake in the drive of a press, comprising two pilot valves simultaneously operable by solenoid coils to control pressure fluid for operating pistons to two valves arranged in parallel in the valve unit, and a switch which responds to pressure differentials between the two valve chambers to inactivate the unit when it fails to function correctly.

The invention provides a valve unit which monitors the proper functioning of the valves and indirectly of the pilot valves, as well as leakages in the valves continuously. It employs double-acting poppet valves which admit the pressure medium through one valve seat and release it into the return through the other valve seat, the controlled, fluid-operated device being connected to chamber between the two valve seats. Openings in the two valve seats of each poppet valve are connected to each other and to a corresponding side of a pressure-differential responsive switch. When the two poppet valves fail to operate in proper synchronism or one of the valves, the difference between the pressures acting on opposite sides of the switch cause the latter to cut off the main power supply.

The invention further proposes to provide an adequate pressure differential for operating the pressure-responsive switch by constricting the inlet flow section of each valve by means of an annular shoulder downstream of the inlet valve seat.

The manner in which the invention can be performed will be described in greater detail with reference to the accompanying drawings which show a preferred embodiment of the invention. In these drawings FIG. 1 is a section of a valve unit for controlling the brake in the drive of a press; and FIG. 2 shows the same valve unit after failure of one of the pilot valves.

A valve casing 1 contains two identical valves 2 and 3 operating in parallel in a manner known to the art. Pressure fluid is admitted from a common inlet 4 to two double-acting poppet valve elements 5 and 5' of the valves 2 and 3. A port 8 for connecting both valves to the controlled fluid-operated device communicates with chambers located between valve seats 6 and 6' through which the pressure medium enters the valves 2, 3 and valve seats 7 and 7' through which the pressure medium flows back to a return port 9 common to both valve elements.

The poppet valve elements are operated by respective, fixedly attached pistons 10 and 10' controlled by electromagnetic pilot valves 12 and 12' comprising solenoid coils 11 and 11'. In the position illustrated in FIG. 1, the pilot valves close two return ports 13 and 13' through which the pressure on the pistons 10 and 10' can be relieved. The pressure medium is led from the pressure inlet 4 through a pipe 26, the pilot valves and ducts 15 and 15' to the cylinders of the pistons 10 and 10' when the solenoids are deenergized, and the pressure in the cylinders of the two pistons 10, 10' is relieved through the two pilot valves 12 and 12' when the coils 11, 11' are energized.

The poppet valve elements 5 and 5' are urged upwards by the fluid pressure in the inlet 4. The valve seats 6 and 6' on the inlet side and the valve seats 7 and 7' on the outlet side toward the return port 9 have seating faces provided with annular openings 14 and 14' which are interconnetced in each valve 2, 3 by ducts 16, 16' in plates 25 and 25' which constitute the seats and by ducts 17 and 17' in the casing 1. Each of the ducts 17 and 17' communicates through a pipe 18 and 18' with corresponding compartments 19, 19' of a cylinder 20 which is axially divided by a piston 21. The piston is normally kept in an axially central position in the cylinder 20 by two springs 22. When the piston is displaced from its central position, a cam face 23 of the piston operates a switch 24 which, in a manner not shown, interrupts the current supply to the two solenoid coils 11 and 11' of the pilot valves.

If one of the pilot valves fails to work properly, or if the two solenoids 11, 11' are not operated simultaneously, the valve unit assumes the position shown in FIG. 2 in which only the right hand pilot valve 12 was energized. The pressure fluid in the controlled brake (not itself shown) is released to the return port 9 through to valve seat 7' of the poppet valve 5' that has not moved. Therefore, the annular opening 14' in the valve seat 6' remains sealed, whereas the opening 14 in the valve seat 6 is open to receive pressure medium from the inlet 4, and the pressures in the two compartments 19 and 19' of the cylinder 20 are unequal, causing the piston 21 to shift into the position shown in FIG. 2 and its edge 23' to actuate the switch 24, which cuts the supply of current to the pilot valves.

The openings 14, 14' communicate through the ducts 16, 16' with recesses 25" in the periphery of the plates 25, 25'. Each plate is fitted with two annular seals 27 or 28 for sealing the joint between the ducts 16, 16' in the plates and the ducts 17, 17' in the valve casing 1. The plates 25, 25' are located in a conventional manner in bores 29 in the casing 1 between spacing sleeves.

The plates 25' which form the valve seats 6 and 6' on the inlet side of the valves are formed with annular shoulders 30, 30' surrounding the seating. The shoulders limit the flow section from the inlet 4 when the poppet valve elements 5 and 5' are open, as is seen in the valve 3 in FIG. 2. The constriction in the flow section is downstream from the openings 14 and 14' to ensure the required pressure differential in the cylinder 20 will actually build up. Because of this constriction of the inlet flow section to less than the flow section into the return port 9 the pressure in the controlled brake connected to the port 8 can be relieved through the open valve seat 7' on the return side of the valve 3 more quickly than pressure can build up through the valve seat 6 at the entry side of the valve 3.

When a leakage occurs in the valve seats a pressure differential is similarly caused in the compartments 19, 19' on opposite sides of the piston 21 which operates the switch 24.

It would be feasible to provide only one pilot valve for controlling both pistons 10 and 10' through a common duct 15.

I claim:
1. In a valve unit having two substantially identical valves; each valve having a first valve seat and a second valve seat defining a chamber therebetween; said first valve seats connecting the associated chambers with a common inlet port; the second valve seats connecting said chambers with a common return port; said chambers communicating with a common controlled port adapted to be connected to a device controlled by the unit; a valve member in each chamber; actuating means for moving each valve member between respective first and second positions of sealing engagement with the corresponding valve seats; and monitoring means for operating a switch in response to a pressure differential between said chambers, the improvement comprising:
(a) two conduits respectively connecting said valves to said monitoring means for transmitting pressure from said chambers to said monitoring means,
  (1) each conduit communicating with respective openings in the first and second valve seats of the associated valve, each opening being closed by the valve member in the position of engagement of the latter with the corresponding valve seat; and
(b) constricting means in each valve chamber for reducing the flow section of the chamber from said first valve seat to said controlled port in said second position of the valve member to less than the flow section of the chamber from said controlled port to said second valve seat in said first position of the valve member,
  (1) the opening in said first valve seat being interposed between said inlet port and said constricting means.

2. In a unit as set forth in claim 1, said seats being annular and said openings being annular.

3. In a unit as set forth in claim 1, wherein said constricting means include an annular shoulder about each first valve seat, said shoulder projecting into the valve chamber in the direction of movement of the valve member from the first position to the second position.

4. In a unit as set forth in claim 3, each valve including a plate member constituting said first seat and integral with said shoulder, said opening in the first valve seat being annular.

References Cited
UNITED STATES PATENTS 3,068,897   12/1962   Ruchser _____ 137—596.16

FOREIGN PATENTS 1,276,374   10/1961   France.

M. CARY NELSON, *Primary Examiner.*

HENRY T. KLINKSIEK, *Examiner.*